United States Patent
Huesges et al.

(10) Patent No.: US 6,834,564 B2
(45) Date of Patent: Dec. 28, 2004

(54) ACCELERATOR PEDAL MODULE

(75) Inventors: Sandra Huesges, Buehlertal (DE); Dirk Meyer, Weinstadt (DE); Mario Huesges, Buehlertal (DE); Radek Caba, Budijovice (CZ)

(73) Assignee: Robert Bosch GmbH, Stuttgart (DE)

( * ) Notice: Subject to any disclaimer, the term of this patent is extended or adjusted under 35 U.S.C. 154(b) by 129 days.

(21) Appl. No.: 10/019,017

(22) PCT Filed: Apr. 25, 2001

(86) PCT No.: PCT/DE01/01575

§ 371 (c)(1),
(2), (4) Date: Jul. 26, 2002

(87) PCT Pub. No.: WO01/81110

PCT Pub. Date: Nov. 1, 2001

(65) Prior Publication Data

US 2003/0047023 A1 Mar. 13, 2003

(30) Foreign Application Priority Data

Apr. 26, 2000 (DE) .......................................... 100 20 486

(51) Int. Cl.⁷ ................................................ G05G 1/14

(52) U.S. Cl. ..................................................... 74/513

(58) Field of Search .......................... 74/512–514, 560

(56) References Cited

U.S. PATENT DOCUMENTS

| | | | | | |
|---|---|---|---|---|---|
| 4,944,269 A | * | 7/1990 | Imoehl | ........................ | 123/399 |
| 4,976,166 A | * | 12/1990 | Davis et al. | .................. | 74/512 |
| 5,013,930 A | * | 5/1991 | Spakowski et al. | ........ | 307/10.1 |
| 5,233,882 A | * | 8/1993 | Byram et al. | .................. | 74/514 |
| 5,408,899 A | * | 4/1995 | Stewart | ........................ | 74/513 |
| 5,934,152 A | * | 8/1999 | Aschoff et al. | ................ | 74/513 |
| 6,098,971 A | | 8/2000 | Kornburger | ................. | 267/251 |
| 6,186,025 B1 | * | 2/2001 | Engelgau et al. | ............. | 74/512 |

FOREIGN PATENT DOCUMENTS

| | | |
|---|---|---|
| DE | 44 26 549 A | 2/1996 |
| EP | 0 748 713 A | 12/1996 |
| GB | 2 349 447 A | 11/2000 |
| WO | WO 97 12780 A | 4/1997 |

* cited by examiner

*Primary Examiner*—Chong H. Kim
(74) *Attorney, Agent, or Firm*—Ronald E. Greigg

(57) ABSTRACT

An accelerator module actuated by the driver's foot for controlling the output of a driving engine or motor of a motor vehicle employs a friction element for generating a friction hysteresis for the purpose of achieving a comfortable driving feel. Support of the pedal lever is completely independent of the generation of the friction hysteresis, resulting in a particularly favorable, especially stable, and play-free support of the pedal lever, and the brake insert for generating the friction hysteresis is particularly easy to manufacture.

18 Claims, 7 Drawing Sheets

ACCELERATOR PEDAL MODULE

CROSS-REFERENCE TO RELATED APPLICATIONS

This application is a 35 USC 371 application of PCT/DE 01/01575 filed on Apr. 25, 2001.

BACKGROUND OF THE INVENTION

1. Field of the Invention

The invention is based on an accelerator pedal module in particular for use in control of an engine.

2. Description of the Prior Art

Japanese patent application no. 60-99729 (JP-A-60-99729) has disclosed an accelerator pedal module with a pedal lever pivotably supported on a support structure, with a sensor which detects an angular position of the pedal lever and emits a corresponding electrical signal, and with a restoring spring system for restoring the pedal lever to a starting position. A bearing pin can be used to support the pedal lever in a very favorable, precise, and play-free manner on the support structure connected to a vehicle body.

Based on the accelerator pedal disclosed in JP-A-60-99729, the object of the invention is to achieve the fact that the pedal lever is precisely supported and that a friction hysteresis occurs when the pedal lever is actuated, where this friction hysteresis should be achieved with simple means and should be precisely definable and in addition, the friction hysteresis should increase with increasing actuation of the pedal lever.

U.S. Pat. No. 5,408,899 has disclosed a pedal apparatus in which a number of spacers are provided for the purpose of generating friction and the coils of restoring springs are supported on the spacers. A movement of the pedal lever produces relative movements between the spacers and the restoring springs. As a result, friction is produced between the spacers and the bearing pin, among the various spacers, and also between the spacers and the restoring springs. In this very expensive design, it is disadvantageous that the friction depends very heavily on dimensional tolerances of the components and another disadvantage is the friction between the spacers and the restoring springs because this results in the fact that the restoring springs, which represent a safety-related component, fail particularly easily with extended use. Another disadvantage is that the friction is not directly related to the restoring force.

International patent application WO 97/12780 has disclosed an accelerator pedal module in which a semicircle with a relatively large radius is provided on the pedal lever and the support structure has a bearing shell in which the semicircle of the pedal lever is supported. The radius of the semicircle and the bearing shell must be relatively large in order to achieve the desired friction. In this design, it is disadvantageous that the support of the pedal lever and the generation of the desired friction occur directly in the same place. Because the friction surface provided between the semicircle and the bearing shell serves not only to produce the friction force but also to support the pedal lever, very high demands must be placed on the form precision as well as the surface quality and concentricity of the friction surface. In other words, because the support location is used not only to support the pedal lever but also to generate the friction, the structural design must take into account not only support considerations but also frictional considerations. Compromises must therefore be made, as a result of which the entire structure is somewhat unstable and the pedal lever is not supported in a particularly precise manner, which can be detected when the electrical signal is generated at high-resolution. In addition, it is quite expensive to produce the known accelerator pedal module.

German patent application DE 4426549 A1 has disclosed an accelerator pedal module in which the pedal lever is supported in two short shell arcs provided with a friction lining. The shell arcs have a relatively large diameter in order to achieve a sufficient friction. Because of the large diameter of the shell arcs and because the shell arcs are relatively short, it must be concluded that in a pedal lever support of this kind, the support of the pedal lever is quite unstable. As a result, a precise electrical signal can hardly be expected with this accelerator pedal module.

SUMMARY OF THE INVENTION

The accelerator pedal module according to the invention has the advantage over the prior art that for a low cost, a precise support of the pedal lever on the support structure can be achieved and a friction force can be achieved that depends on the actuated pivot angle of the pedal lever. A particular advantage is that the generation of the friction force is achieved by simple means. It is particularly advantageous that the pedal lever support and the friction force generation are achieved by mutually independent means. The means for supporting the pedal lever and the means for generating the friction force can each be optimally designed for their respective purposes. As a result, a high degree of precision can be achieved in the support of the pedal lever. The precise support of the pedal lever has the advantage that a precise electrical signal can be produced that indicates the position of the pedal lever.

If two friction surfaces and two friction elements are provided, then this has the advantage that the support of the pedal lever in the vicinity of the support location can be embodied as essentially symmetrical, as a result of which the precision in the support of the pedal lever can be improved even further. In particular, the two friction surfaces and friction elements can be affixed symmetrically with regard to the longitudinal direction of the pedal lever.

The crossbar can be used to connect the two friction elements to each other in a very simple manner and the restoring spring system can act on the crossbar. As a result, the entire design is very simple and a uniform distribution of the force of the restoring spring system onto the two friction elements can be advantageously achieved.

The coupling lever can advantageously transfer the force of the restoring spring system onto the friction element.

If the coupling lever is connected to the support structure in a one-piece, articulating fashion, then this has the advantage that fewer components have to be assembled.

If the coupling lever is connected to the friction element in a one-piece, articulating fashion, then this has the advantage that the friction element and the coupling lever can be produced together and fewer components have to be assembled during assembly of the accelerator pedal module.

BRIEF DESCRIPTION OF THE DRAWINGS

Preferably selected, particularly advantageous exemplary embodiments of the invention are described herein below in conjunction with the drawings, in which.

DESCRIPTION OF THE PREFERRED EMBODIMENTS

Figure 1:
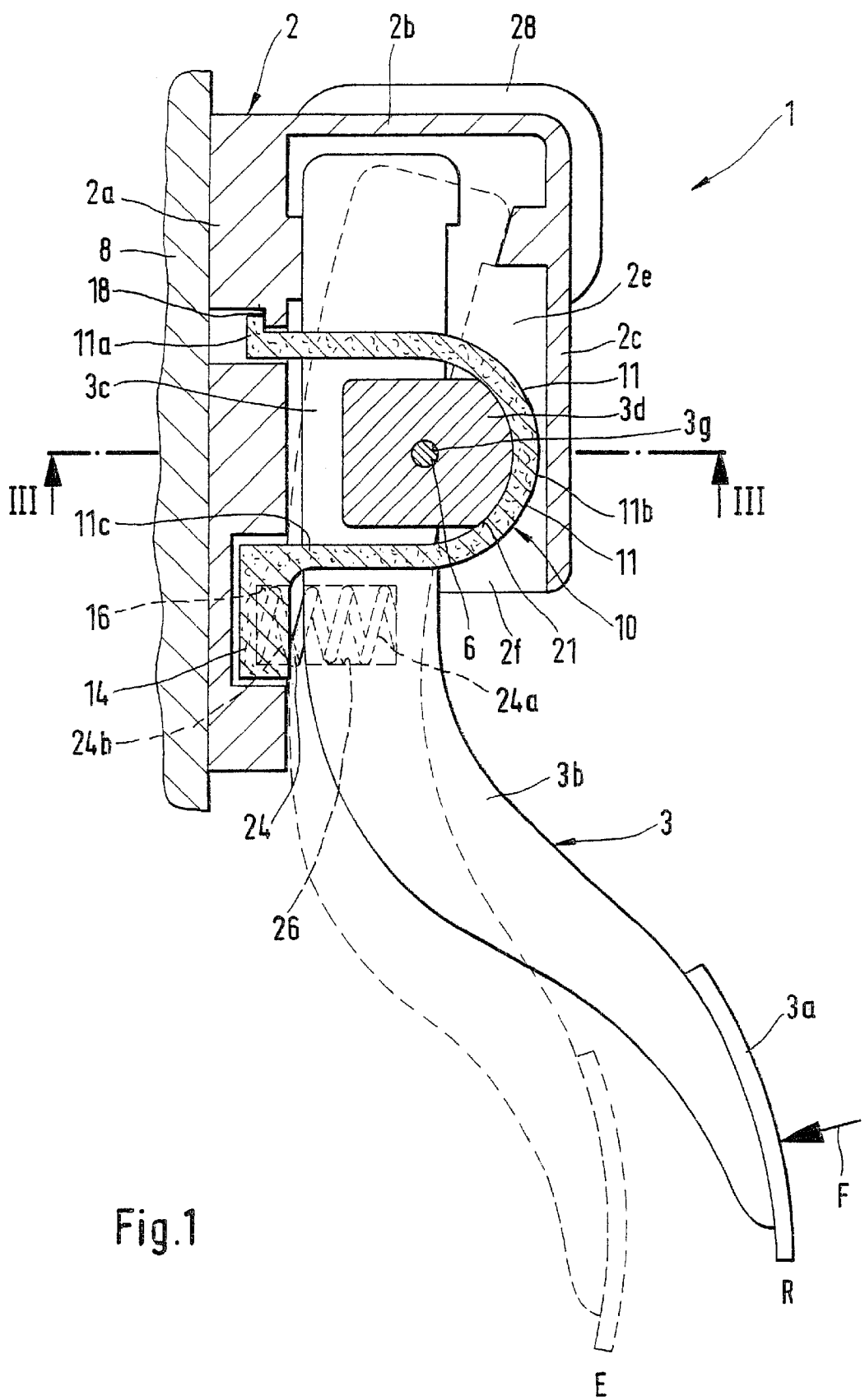
FIG. 1 shows a longitudinal section taken on line I—I of FIG. 3, through a first exemplary embodiment of the invention.

The accelerator pedal module 1 embodied according to the invention can be used to control different driving engines. For example, the drive engine is an Otto engine whose throttle valve is adjusted with a servomotor. In this instance, the accelerator pedal module is used to transmit electrical signals which are supplied to the servomotor that adjusts the throttle valve. However, the driving engine can also be a diesel engine or an electric motor, for example; in these cases as well, electrical signals are emitted by the accelerator pedal module 1 which, appropriately transformed, control the output of the driving engine.

The accelerator pedal module 1 is preferably fastened to a part of the vehicle directly in the vehicle driver's range of action. The pedal lever 3 of the accelerator pedal module 1 is frequently also referred to as the gas pedal.

In all the figures, parts which are the same or function in the same manner are provided with the same reference numerals. Provided that nothing to the contrary is mentioned or shown in the drawings, that which is mentioned in conjunction with one of the figures and shown in it also applies to the other exemplary embodiments. Provided that nothing to the contrary is stated in the explanations, the details of the different exemplary embodiments can be combined with one another.

Figure 2:
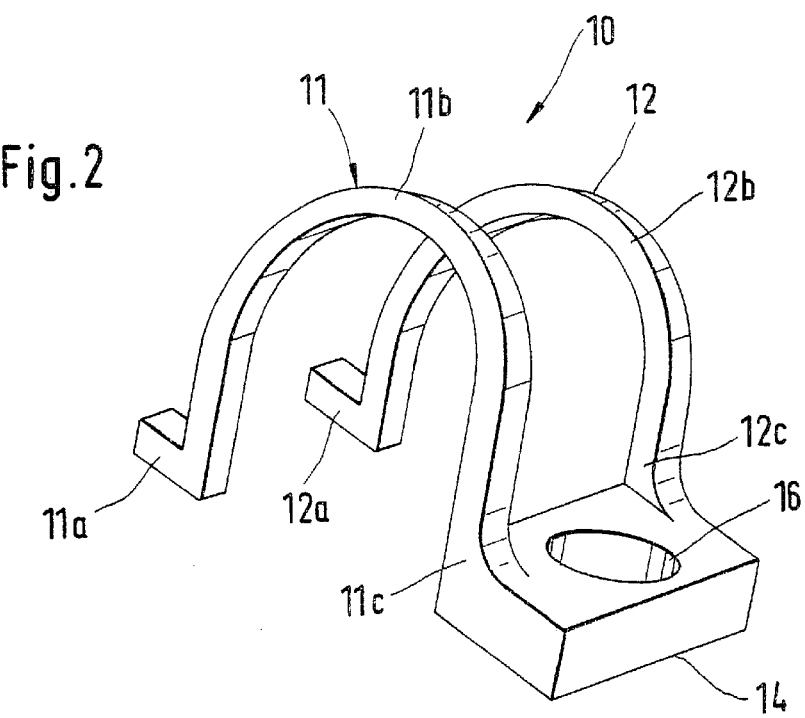
FIG. 2 shows a detail of the first exemplary embodiment.
Figure 3:
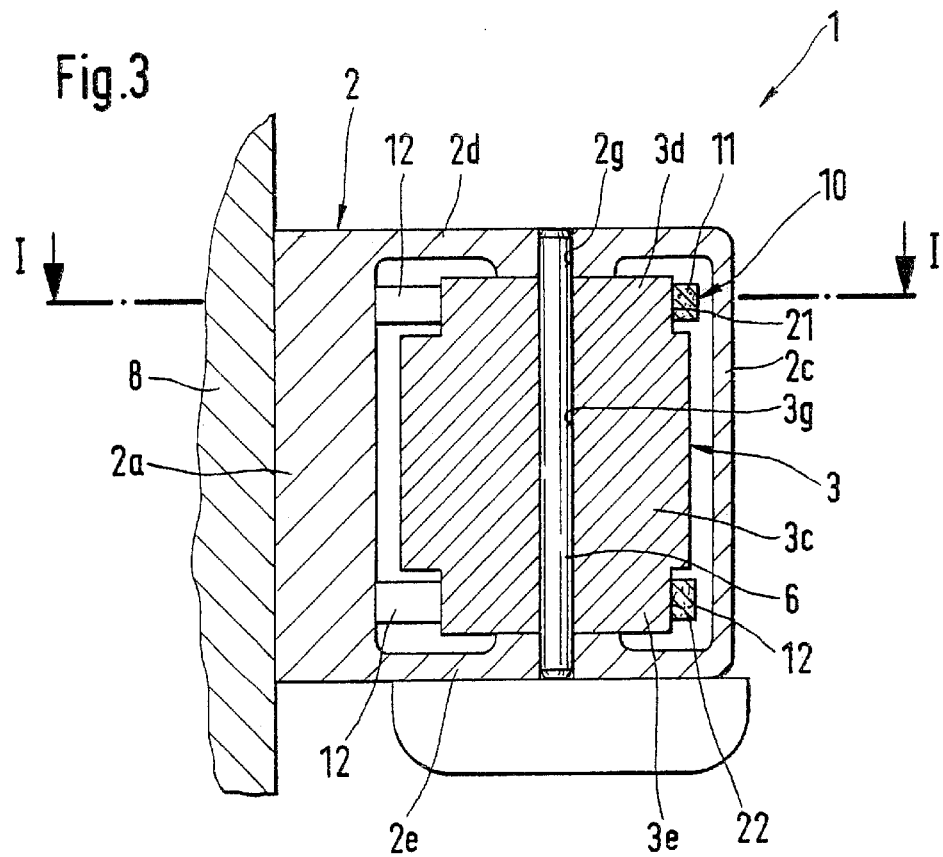
FIG. 3 shows a cross section through the first exemplary embodiment taken on line III—III of FIG. 1.

FIGS. 1, 2, and 3 show a preferably selected, particularly advantageous first exemplary embodiment. FIG. 1 shows a longitudinal section through the accelerator pedal module 1. The sectional plane and viewing direction shown in FIG. 1 is labeled I—I in FIG. 3. FIG. 2 shows the brake insert 10 of the accelerator pedal module 1 before its installation into the accelerator pedal module 1. FIG. 3 shows a cross section through the accelerator pedal module 1. The cutting plane and viewing direction shown in FIG. 3 are labeled III—III in FIG. 1.

The accelerator pedal module 1 includes a support structure 2 and a pedal lever 3. The support structure 2 is embodied in the form of a housing. The support structure 2 has a bottom 2a, a back 2b, a top 2c, a first side wall 2d, a second side wall 2e, and an opening 2f. The pedal lever 3 has a pedal plate 3a, a shaft 3b, and a bearing region 3c. Lateral to the longitudinal direction of the pedal lever 3, the bearing region 3c has a first projection 3d and a second projection 3e that protrude laterally beyond the bearing region 3c. In the bearing region 3c of the pedal lever 3, there is a bore 3g; and a housing bore 2g extends through the side walls 2d, 2e of the support structure 2. A bearing pin 6 is inserted into the housing bore 2g of the support structure 2 and the bore 3g of the pedal lever 3. The bearing pin 6 is inserted with a press-fit into the bearing region 3c of the pedal lever 3 and is inserted with a slight press-fit into the first side wall 2d and into the second side wall 2e of the support structure 2. The bearing pin 6 assures that the pedal lever 3 is supported so that it can pivot on the support structure 2 in a precise and exact manner without wobbling.

The support structure 2 is fastened to a body part 8 of a motor vehicle. The bearing region 3c of the pedal lever 3 is disposed inside the housing-like support structure 2. The shaft 3b of the pedal lever 3 protrudes out of the support structure 2 through the opening 2f. The pedal plate 3a is disposed at the protruding end of the shaft 3b.

A brake insert 10 is provided in the accelerator pedal module 1. The brake insert 10 is shown separately in an oblique view in FIG. 2.

In the selected exemplary embodiment for FIGS. 1, 2, and 3, the brake insert 10 is essentially comprised of a first friction element 11, a second friction element 12, and a crossbar 14. The friction element 11 has a bottom linkage point 11a, a friction region 11b, and a spring-side linkage point 11c. The friction region 11b is disposed approximately half the distance between the two linkage points 11a and 11c. The second friction element 12 is embodied as the mirror image of the friction element 11 and works in parallel with the friction element 11. The second friction element 12 has a bottom linkage point 12a, a friction region 12b, and a spring-side linkage point 12c. The second friction region 12b is disposed approximately half the distance between the two linkage points 12a and 12c. The crossbar 14 connects the spring-side linkage point 11c of the friction element 11 to the spring-side linkage point 12c of the second friction element 12. In the center, between the two friction elements 11, 12, there is a spring linkage point 16 embodied in the form of a blind bore in the crossbar 14. The crossbar 14 connects the spring-side linkage point 11c to the spring-side linkage point 12c. As is shown particularly by FIG. 2, in the exemplary embodiment shown in FIGS. 1, 2, and 3, the brake insert 10 that includes the friction elements 11, 12 and the crossbar 14 is embodied as one piece. The entire brake insert 10 can be produced together in a single mold by means of injection molding.

The support structure 2 contains a support surface 18 oriented away from the pedal lever 3.

At the projection 3d of the pedal lever 3, there is a friction surface 21 concentric to the bearing pin 6; and a second friction surface 22 is provided on the second projection 3e of the pedal lever 3, concentric to the bearing pin 6.

The bottom linkage point 11a of the friction element 11 is attached to the support surface 18 of the support structure 2. In other words, the bottom linkage point 11a and the support surface 18 are provided so that the friction element 11 can be suspended on the support structure 2 and secured by it. The friction surface 21 of the pedal lever 3 points away from the bottom 2a of the support structure 2. The friction region 11b of the friction element 11 rests against the friction surface 21 of the pedal lever 3. The bottom linkage point 11a and the spring-side linkage point 11c protrude beyond the friction surface 21. The friction surface 21 and the friction region 11b are disposed between the bottom linkage point 11a and the spring-side linkage point 11c.

The pedal lever 3 can be adjusted between a non-actuated starting position R and a completely actuated end position E. The pedal lever 3 is shown in its starting position R. Individual regions of the pedal lever 3 are also indicated with dashed lines in FIG. 1, when the pedal lever 3 is disposed in its end position E.

The accelerator pedal module 1 has a restoring spring system 24. The restoring spring system 24 has a first acting side 24a that engages the pedal lever 3 and a second acting side 24b that engages the spring-side linkage point 11c and the spring-side linkage point 12c of the two friction elements 11 and 12. A spring linkage point 26 is provided on the pedal lever 3. The spring linkage point 26 is embodied in the form of a blind bore and thus constitutes sufficient space for containing a part of the restoring spring system 24 and for guiding the restoring spring system 24. The two blind bores of the spring linkage points 16 and 26 are essentially flush with each other. The restoring spring system 24 has the form of a helically wound compression spring. The restoring spring system 24 can also be comprised of several individual springs next to one another acting in parallel. The first acting side 24a is disposed inside the blind bore of the spring linkage point 26 and the second acting side 24b of the restoring spring system 24 is disposed inside the blind bore of the spring linkage point 16.

The restoring spring system 24 presses the pedal lever 3 into its non-actuated starting position R.

By means of the crossbar 14 and by means of the spring-side linkage point 11c, the second acting side 24b of the restoring spring system 24 presses the friction region 11b of the friction element 11 against the friction surface 21 provided on the pedal lever 3. The support surface 18 of the support structure 2 secures the bottom linkage point 11a of the friction element 11 with a force which is essentially of the same magnitude as the force that the restoring spring system 24 exerts on the spring-side linkage point 11c. The force acting on the friction element 11 via the bottom linkage point 11a vectorially added to the force acting via the spring-side linkage point 11c equals the force with which the friction region 11b of the friction element 11 is pressed against the friction surface 21 of the pedal lever 3. The force with which the friction region 11b of the brake insert 10 presses against the friction surface 21 of the pedal lever 3 when the pedal lever 3 is actuated produces a friction force that opposes the movement of the pedal lever 3.

Figure 10:
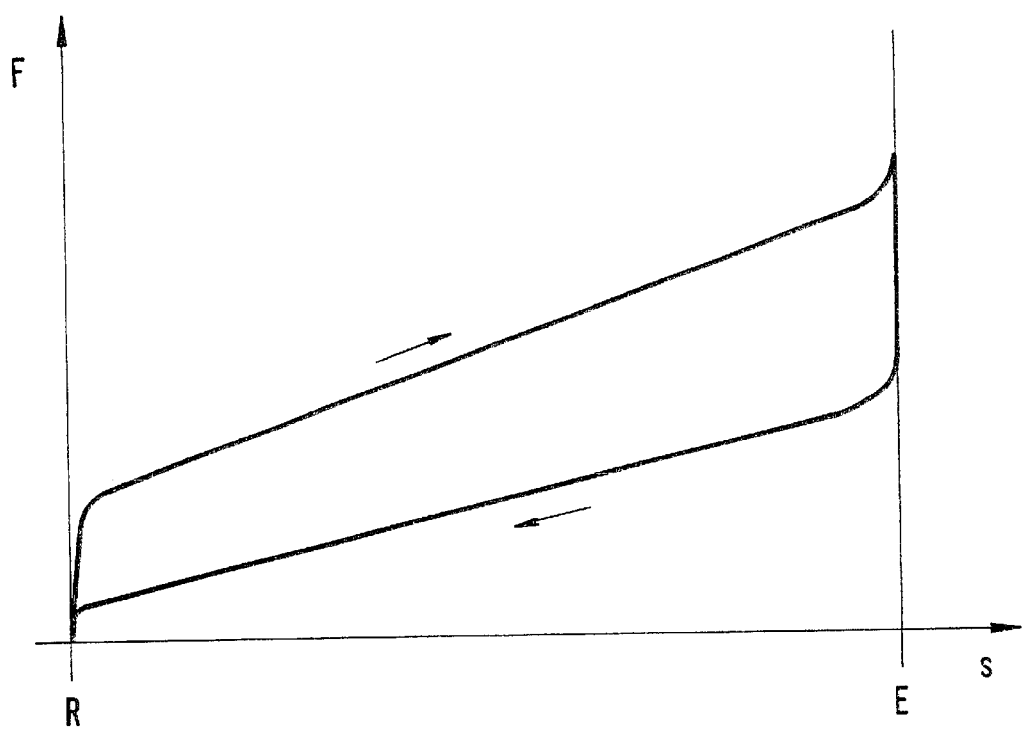
FIG. 10 is a graph that shows the dependence of the actuation force F on the actuation path s of the pedal lever.

FIG. 10 shows the actuation force F as a function of the adjustment path s. The actuation force F is the force acting on the pedal plate 3a during actuation of the pedal lever 3. When the pedal lever 3 is actuated from the starting position R into the end position E, the actuation force F is significantly greater than the actuation force F that occurs when the pedal lever 3 is actuated from the actuated end position E back into the starting position R. In FIG. 10, the upper diagonal line shows the actuation force F when the pedal lever 3 is actuated from the starting position R into the end position E and the lower diagonal line shows the actuation force F when the pedal lever 3 is actuated from the actuated end position E into the starting position R.

Because the restoring spring system 24 is under less tension in the vicinity of the starting position R and because as a result, the force exerted by the restoring spring system 24 is less than the force exerted by the restoring spring system 24 when the pedal lever 3 is disposed in the actuated end position E, the friction force is less intense when the pedal lever 3 is disposed in the vicinity of the starting position R than when the pedal lever 3 is disposed in the vicinity of the end position E. This is also shown in FIG. 10 because, as can be inferred from FIG. 10, the distance between the upper diagonal line and the lower diagonal line is distinctly less in the vicinity of the starting position R than in the vicinity of the actuated end position E. This produces a desirable, particularly comfortable foot feel for the driver during actuation of the pedal lever 3.

The brake insert 10 is embodied in the same way in the vicinity of the second friction element 12 as in the vicinity of the friction element 11 and the second friction element 12 acts on the pedal lever 3 in the same way as the friction element 11.

A sensor 28 is connected to the support structure 2. The sensor 28 has a sensor lever that is not shown. The movements of the sensor lever are coupled to the movements of the pedal lever 3. Depending on the position of the sensor lever and pedal lever 3, the sensor 28 sends an electrical signal to an electrical control unit that is not shown via an electrical line that is also not shown. The electrical control unit in turn controls, for example, a throttle valve that is not shown, which can be used to control the output of a driving engine. The sensor 28 and the pedal lever 3 are connected, for example, in the manner extensively described and depicted in WO 97/12780.

At least in its central region, i.e. in the vicinity of the friction region 11b, the friction element 11 is quite flexible so that the friction region 11b adapts favorably to the friction surface 21 due to the force of the restoring spring system 24. This offers the advantage that only very low demands have to be placed on the shaping precision and the concentricity of the friction surface 21. In addition, only very low demands have to be placed on the manufacture and shaping precision of the friction element 11. This has the advantage that the friction surfaces 21 and 22 can be manufactured at a very low cost. The friction elements 11 and 12 can also be produced very simply, with a very simple manufacturing process. As a result, the pedal lever 3 and also the brake insert 10 can be manufactured by means of an inexpensive process, for example by means of injection molding. No subsequent finishing work is required either for the friction surfaces 21 and 22 or for the friction elements 11 and 12.

FIGS. 3, 4, 5, and 6 show a second preferably selected, particularly advantageous exemplary embodiment.

Figure 4:
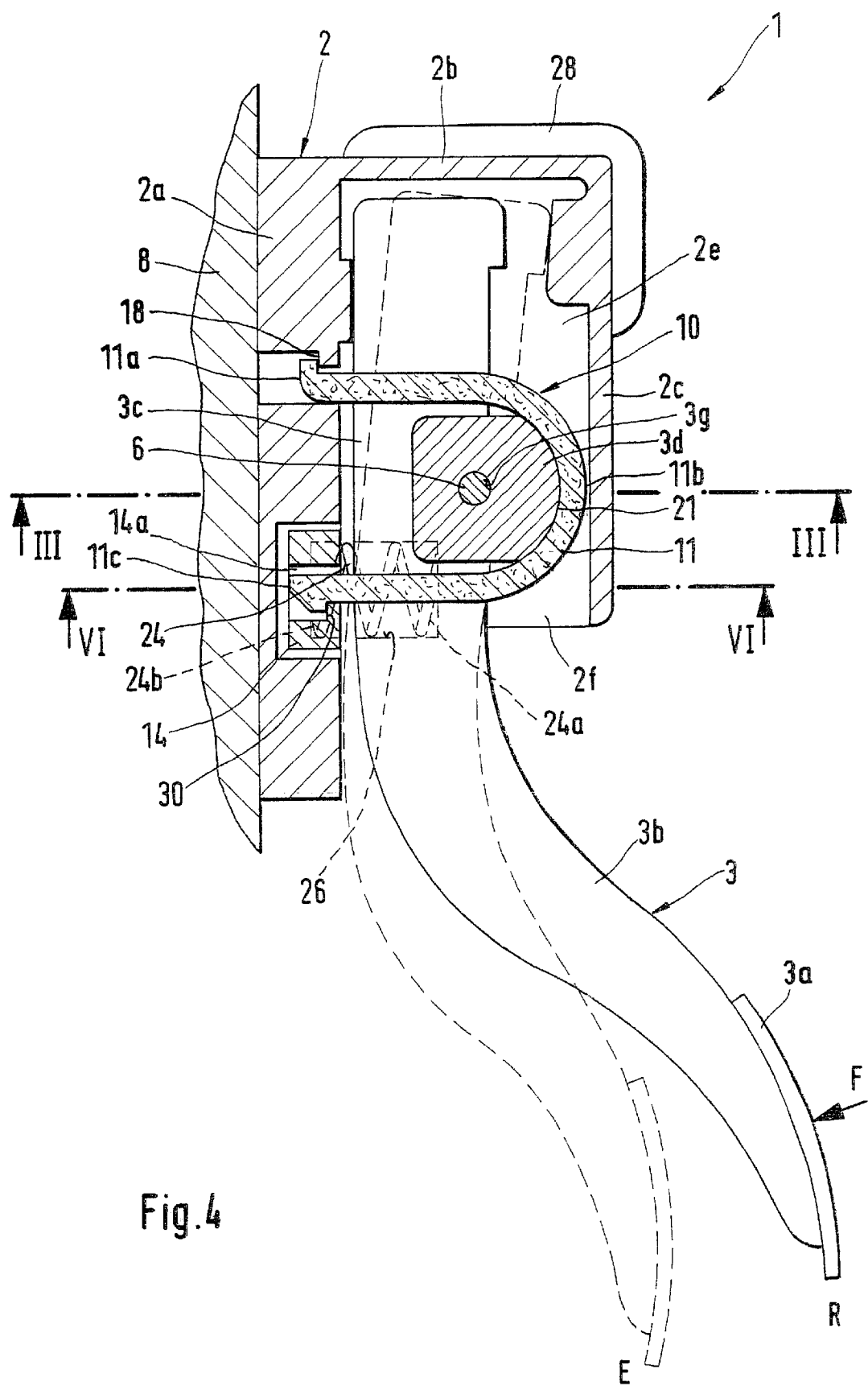
FIG. 4 shows a longitudinal section through a second exemplary embodiment.
Figure 5:
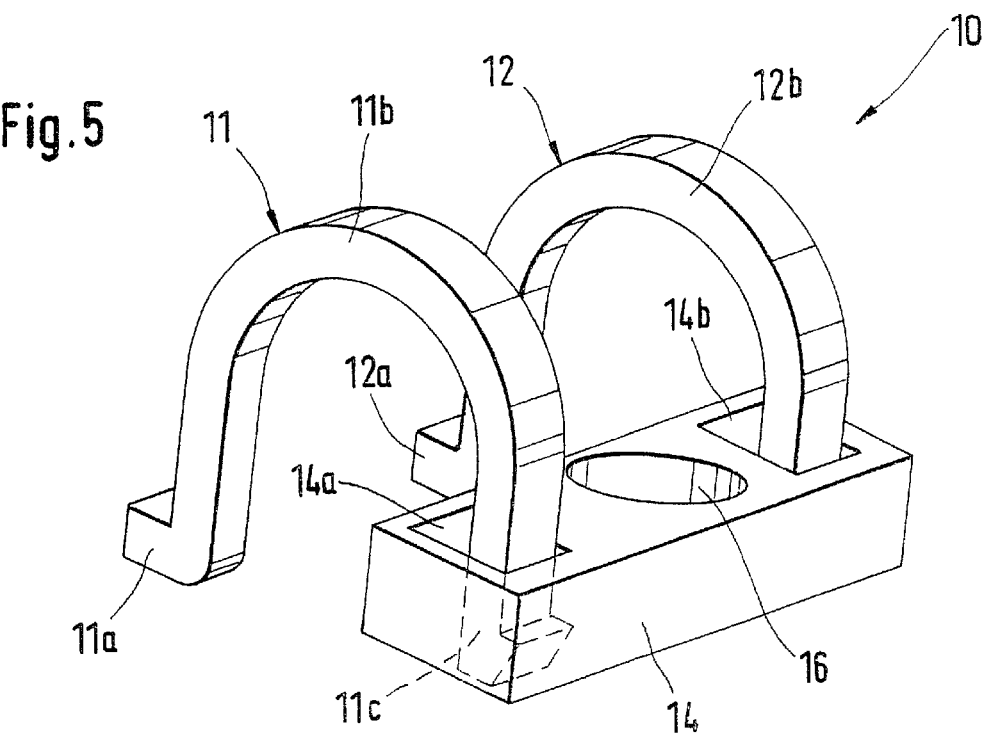
FIG. 5 shows details of the second exemplary embodiment.
Figure 6:
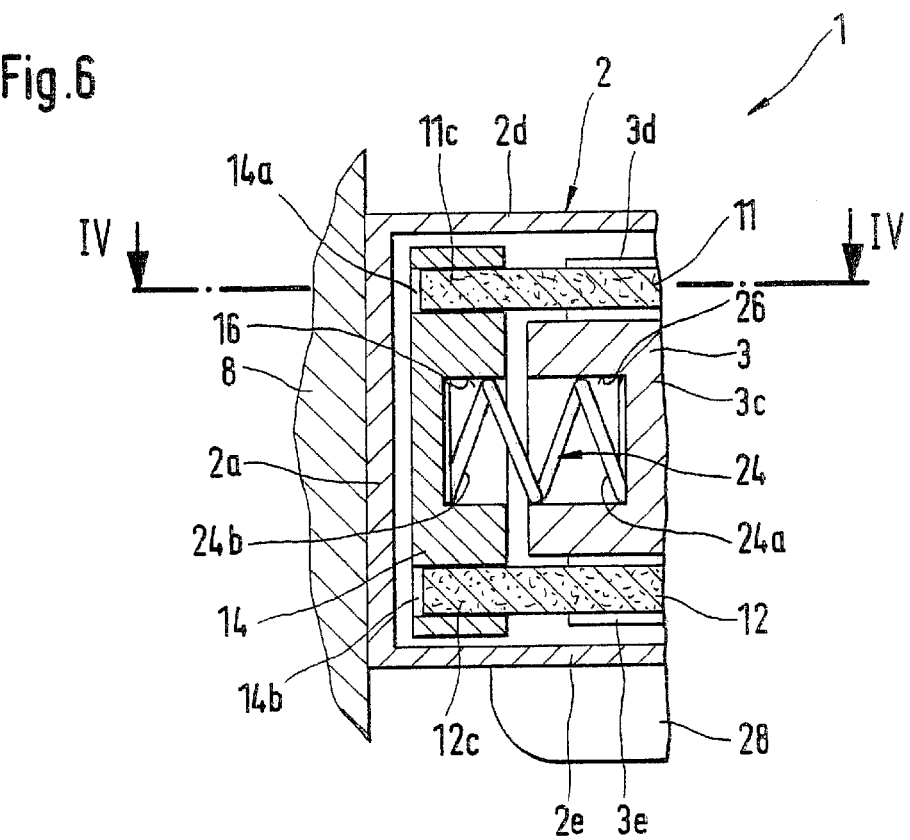
FIG. 6 shows a partial section through the second exemplary embodiment.

FIG. 3 applies to both the first exemplary embodiment and the second exemplary embodiment. The cutting plane shown in FIG. 3 is also labeled III—III in FIG. 4. FIG. 4 shows a longitudinal section through the accelerator pedal module 1. The cutting plane shown in FIG. 4 is labeled I—I in FIG. 3 and is labeled IV—IV in FIG. 6. FIG. 5 shows a detail of the brake insert 10 from the second exemplary embodiment. FIG. 6 shows a partial section through the brake pedal module 1. The cutting plane and viewing direction shown in FIG. 6 is labeled VI—VI in FIG. 4.

By contrast to the brake insert 10 shown in FIG. 2, the brake insert 10 of the second exemplary embodiment shown in FIG. 5 is not embodied of one piece, but rather the brake insert 10 is assembled by snapping together the friction element 11, the second friction element 12, and the crossbar 14.

In the vicinity of the bottom linkage points 11a and 12a, the brake insert 10 in the second exemplary embodiment is connected to the support structure 2 in the same way as in the first exemplary embodiment.

In the second exemplary embodiment, the crossbar 14 has a stepped through opening 14a and likewise stepped through opening 14b. In the course of the through opening 14a, there is a support surface 30. The support surface 30 is oriented away from the pedal lever 3. The spring-side linkage point 11c of the friction element 11 is hook-shaped. The linkage point 11c is dimensioned so that it can be pressed into the through opening 14a with a slight pressure. It is practically impossible to remove the spring-side linkage point 11c from the through opening 14a because the hook-shaped spring-side linkage point 11c is supported against the support surface 30 provided on the crossbar 14. The second friction element 12 is connected to the crossbar 14 in the same manner as the friction element 11.

The brake insert 10 can be assembled by simply snapping together the very easy-to-produce friction elements 11, 12 and the crossbar 14.

Figure 7:
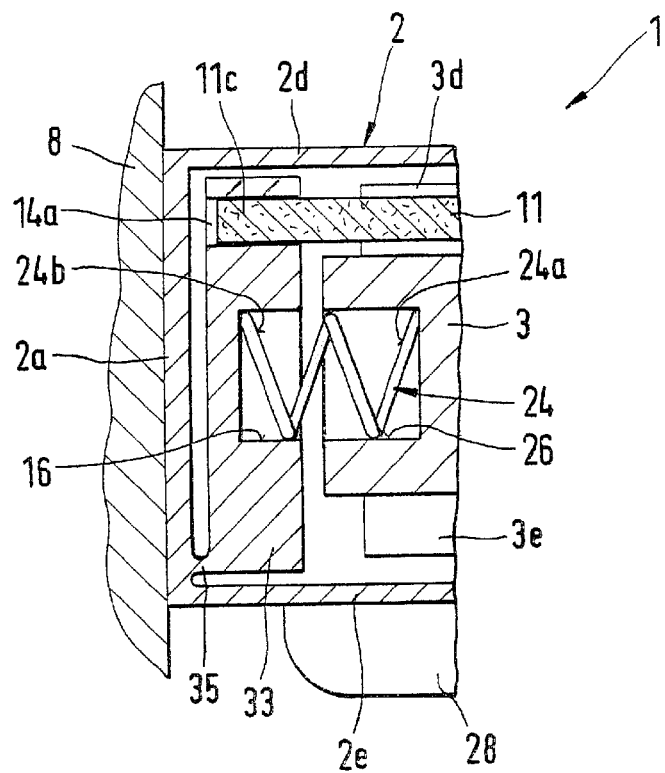
FIG. 7 shows a partial section through a third exemplary embodiment.

FIG. 7 shows a partial section through a third preferably selected, particularly advantageous exemplary embodiment.

The cutting plane shown in FIG. 7 corresponds approximately to the cutting plane in the second exemplary embodiment shown in FIG. 6. Details not shown in FIG. 7 essentially correspond to the details explained in conjunction with the first and second exemplary embodiments.

In the exemplary embodiment shown in FIG. 7, a coupling lever 33 is formed onto the support structure 2. The coupling lever 33 can be produced along with the support structure 2 in a single mold by means of casting.

The coupling lever 33 is only connected to the support structure 2 in a very narrow region. This produces a one-piece, articulating connection 35 at the narrow region between the coupling lever 33 and the support structure 2. The articulating connection 35 is disposed at one end of the coupling lever 33 and at the opposite end of the coupling lever 33, the through opening 14a is provided in the coupling lever 33. The connection 35 serves as a hinge between the coupling lever 33 and the support structure 2. The spring-side of linkage point 11c of the friction element 11 is inserted into the through opening 14a of coupling lever 33, as described in particular in conjunction with the second exemplary embodiment in FIG. 5.

The spring linkage point 16 is provided on the coupling lever 33. The restoring spring system 24 acts on the coupling lever 33 via the spring linkage point 16 and acts on the friction element 11 via the coupling lever 33 and the spring-side linkage point 11c. As a result, in the third exemplary embodiment as well, the restoring spring system 24 presses the friction region 11b of the friction element 11 against the friction surface 21 provided on the pedal lever 3.

In contrast to the first exemplary embodiment and the second exemplary embodiment, in the third exemplary embodiment, the second friction element 12 is eliminated. As a result, the third exemplary embodiment requires fewer components to be produced and assembled.

Because the second friction element 12 is eliminated in the third exemplary embodiment, the second friction surface 22 and the second projection 3e on the pedal lever 3 can also be eliminated.

Figure 8:
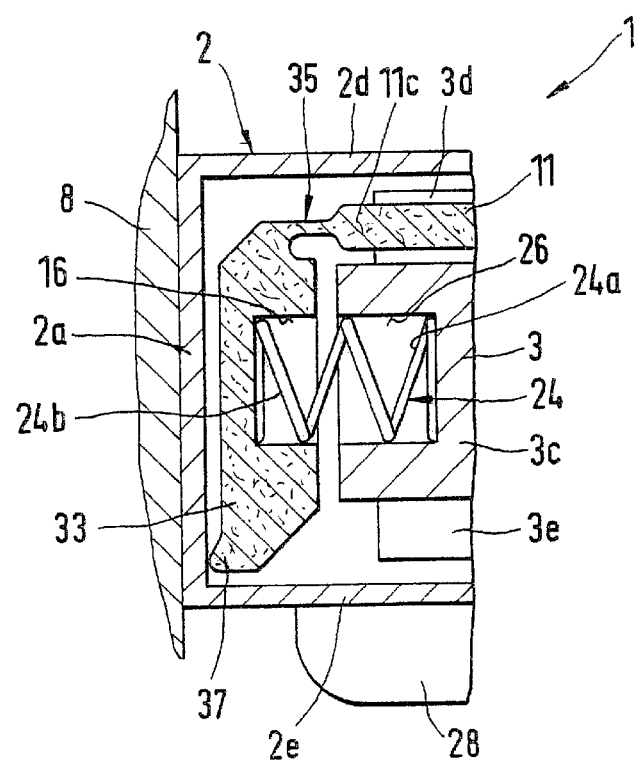
FIG. 8 shows a partial section through a fourth exemplary embodiment.

FIG. 8 shows a fourth preferably selected, particularly advantageous exemplary embodiment.

In contrast to the exemplary embodiment shown in FIG. 7, in the exemplary embodiment shown in FIG. 8, the one-piece, articulating connection is not provided between the coupling lever 33 and the support structure 2, but instead is disposed between the coupling lever 33 and the spring-side linkage point 11c of the friction element 11. This offers the advantage that the friction element 11 and the coupling lever 33 can be produced together in a single mold by means of casting and/or injection molding.

At the end of the coupling lever 33 remote from the connection 35, the coupling lever 33 is supported against the bottom 2a of the support structure 2 by means of a rocker bearing 37. This assures that the force from the second acting side 24b of the restoring spring system 24 acting on the rocker arm 33 is transmitted by means of the rocker arm 33 and the one-piece, articulating connection 35 onto the friction element 11 and from the friction element 11 onto the friction surface 21 of the pedal lever 3.

Figure 9:
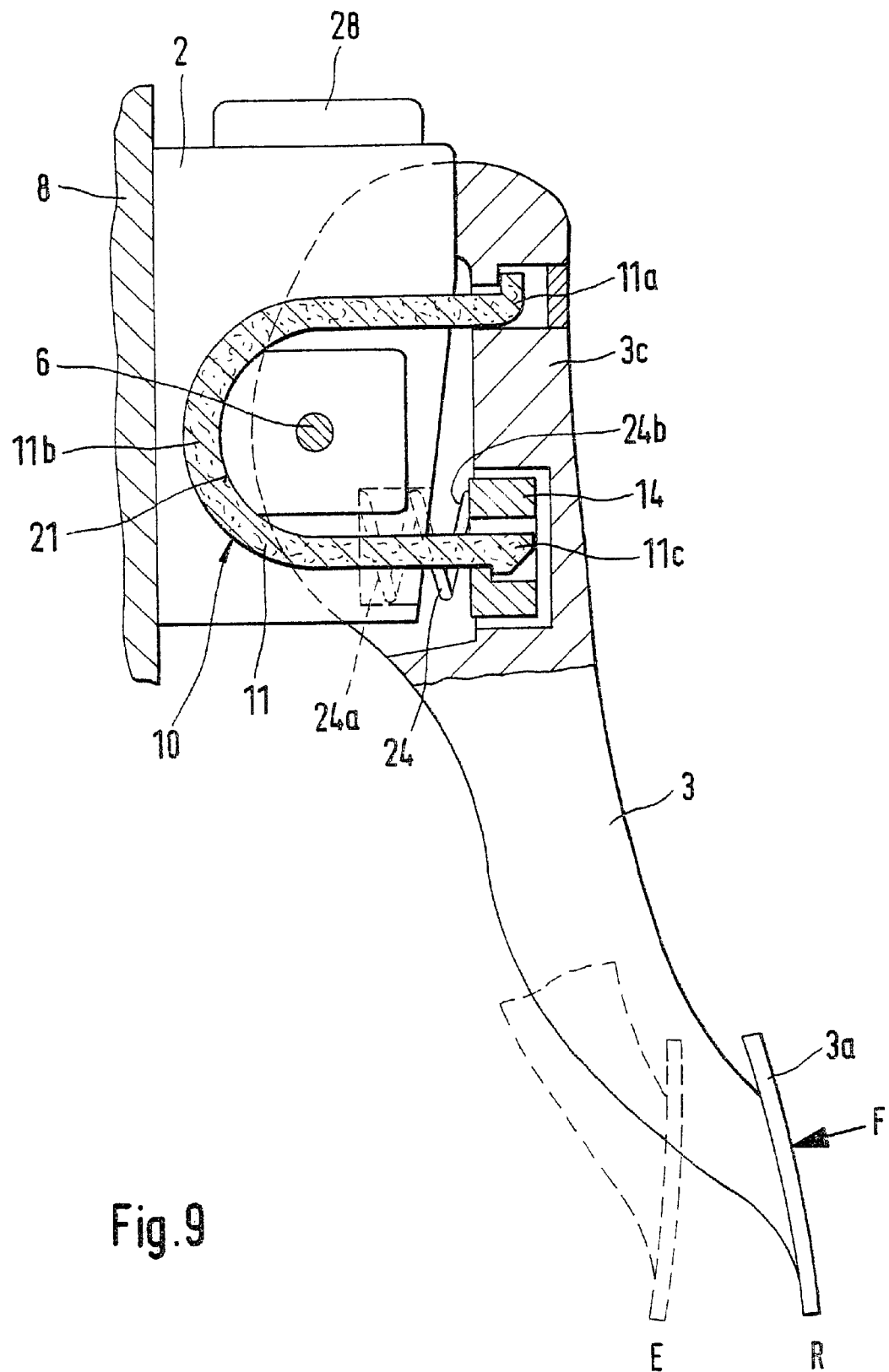
FIG. 9 shows a longitudinal section through a fifth exemplary embodiment.

FIG. 9 shows a longitudinal section through a fifth preferably selected, particularly advantageous exemplary embodiment.

In the exemplary embodiments shown in FIGS. 1 to 8, the brake insert 10 with the friction element 11 and possibly also with the second friction element 12 is associated with the support structure 2. Correspondingly, the friction surface 21 is associated with the pedal lever 3. When the pedal lever 3 is actuated, the friction elements 11, 12 of the brake insert 10 remain stationary and the friction surface 21 associated with the pedal lever 3 is moved along the stationary friction region 11b, 12b of the brake insert 10. By contrast, in the exemplary embodiment shown in FIG. 9, the friction surface 21 and possibly the second friction surface 22 are associated with the support structure 2. Consequently, the friction surface 21 and possibly the additional friction surface 22 remain stationary even when the pedal lever 3 is actuated. In the exemplary embodiment shown in FIG. 9, the brake insert 10 with the friction element 11 and possibly the additional friction element 12 is associated with the pedal lever 3. When the pedal lever 3 is moved, the brake insert 10 with the friction element 11 and possibly the additional friction element 12 moves along with the pedal lever 3.

In exemplary embodiment shown in FIG. 9, the first acting side 24a of the restoring spring system 24 presses against the stationary support structure 2 and the second acting side 24b of the restoring spring system 24 presses against the crossbar 14 of the brake insert 10 and consequently presses the friction region 11b of the friction element 11, which moves when the pedal lever 3 in is actuated, against the stationary friction surface 21. The second acting side 24b of the restoring spring system 24 acts on the pedal lever 3 by means of the crossbar 14, the friction element 11, and the linkage point 11a of the friction element 11 with the pedal lever 3, and tries to move the pedal lever 3 into its starting position R.

In contrast to the exemplary embodiments shown in FIGS. 1 to 8, in the exemplary embodiment shown in FIG. 9, the associations of the brake device 10 and therefore of the friction elements 11 and 12 and the friction surfaces 22 is reversed. More precisely stated, the brake device 10 with the friction element 11 and 12 is not associated with the support structure 2 but rather with the pedal lever 3. And the friction surfaces 21 are not associated with the pedal lever 3, but rather with the support structure 2. All other details can be embodied in a correspondingly adapted manner, or alternatively in the same manner as in the exemplary embodiments explained in conjunction with FIGS. 1 to 8. In order to avoid unnecessary repetition, please refer to FIGS. 1 to 8 with regard to details not shown in FIG. 9.

In the selected exemplary embodiments shown in FIGS. 1 to 9, the bearing pin 6 is supported in the housing bore 2g of the support structure 2 and in the bore 3g of the pedal lever 3. However, it is also possible for the bearing pin 6 to be formed directly onto the pedal lever 3, protruding laterally out from it. In this instance, the bore 3g is eliminated. On the other hand, is also possible to form the bearing pin 6 directly onto the support structure 2. In this case, the housing bore 2g is eliminated.

In the exemplary embodiments shown in FIGS. 1 to 8, the friction elements 11, 12 are clipped to the support structure 2 at the bottom linkage points 11a, 11b. It is also possible for the friction elements 11, 12 to be formed in one piece onto the support structure 2 at the bottom linkage points 11a, 11b. The same also applies to the exemplary embodiment shown in FIG. 9. In this instance, for example, the friction element 11 can be formed in one piece onto the pedal lever 3 at its bottom linkage point 11a.

The foregoing relates to preferred exemplary embodiment of the invention, it being understood that other variants and embodiments thereof are possible within the spirit and scope of the invention, the latter being defined by the appended claims.

We claim:

1. An accelerator pedal module for controlling the output of the driving engine of a motor vehicle, comprising a pedal lever (3) pivotably supported on a support structure (2) by means of a bearing pin (6), a sensor (28) that detects an angle position of the pedal lever (3) and supplies a corresponding electrical signal to a control unit, and a restoring spring system (24) with a first acting side (24a) and a second acting side (24b), where in order to restore the pedal lever (3) into a starting position (R), the restoring spring system (24) engages the pedal lever (3) with the first acting side (24a), said pedal lever (3) being provided with at least one friction surface (21) essentially concentric to the bearing pin (6) and at least one friction element (10, 11, 12) that rests against the friction surface (21), said friction element (10, 11, 12) having a bottom linkage point (11a, 12a) and a spring-side linkage point (11c, 12c) with the friction surface (21) being disposed between the bottom linkage point (11a, 12a) and the spring-side linkage point (11c, 12c), the bottom linkage point (11a, 12a) being coupled to the support structure (2) and the second acting side (24b) of the restoring spring system (24) acting on the spring-side linkage point (11c, 12c) of the friction element (10, 11, 12).

2. The accelerator pedal module according to claim 1, further comprising a second friction surface (12) on said pedal lever (3) essentially concentric to the bearing pin (6) and a second friction element (12) on said accelerator pedal module resting against the second friction surface (12), said second friction element (12) having a bottom linkage point (12a) and spring-side linkage point (12c), said second friction surface (12) being disposed between the bottom linkage point (12a) and the spring-side linkage point (12c) of the second friction element (12), said second acting side (24b) of the restoring spring system (24) acting on the spring-side linkage point (12c) of the second friction element (12).

3. The accelerator pedal module according to claim 2, wherein the spring-side linkage point (11c) of the first friction element (11) and the spring-side linkage point (12c) of the second friction element (12) are connected to each other via a crossbar (14).

4. The accelerator pedal module according to claim 3, wherein the crossbar (14) is embodied as one piece with the first friction element (11) and the second friction element (12).

5. The accelerator pedal module according to claim 3, wherein the crossbar (14), the first friction element (11), and the second friction element (12) are comprised of a number of assembled individual parts (10, 11, 12, 14).

6. The accelerator pedal module according to claim 3, wherein the crossbar (14) is articulatingly connected to the at least one friction element (11).

7. The accelerator pedal module according to claim 3, wherein the restoring spring system (24) acts on the crossbar (14).

8. The accelerator pedal module according to claim 4, wherein the restoring spring system (24) acts on the crossbar (14).

9. The accelerator pedal module according to claim 5, wherein the restoring spring system (24) acts on the crossbar (14).

10. The accelerator pedal module according to claim 6, wherein the restoring spring system (24) acts on the crossbar (14).

11. The accelerator pedal module according to claim 1, wherein the restoring spring system (24) acts on the spring-side linkage point (11c) of the at least one friction element (11) via a coupling lever (33) supported on the support structure (2).

12. The accelerator pedal module according to claim 11, wherein the coupling lever (33) is connected to the support structure (2) via a one-piece, articulating connection (35).

13. The accelerator pedal module according to claim 11, wherein the coupling lever (33) is connected to the spring-side linkage point (11c) of the at least one friction element (11) via a one-piece, articulating connection (35).

14. The accelerator pedal module according to claim 12, wherein the coupling lever (33) is connected to the spring-side linkage point (11c) of the at least one friction element (11) via a one-piece, articulating connection (35).

15. The accelerator pedal module according to claim 11, wherein the coupling lever (33) is rigidly connected to the spring-side linkage point (11c) of the at least one friction element (11).

16. An accelerator pedal module for controlling the output of the driving engine of a motor vehicle, comprising a pedal lever (3) pivotably supported on a support structure (2) by means of a bearing pin (6), a sensor (28) that detects an angle position of the pedal lever (3) and supplies a corresponding electrical signal to a control unit, and having a restoring spring system (24) with a first acting side (24a) and a second acting side (24b), where in order to restore the pedal lever (3) into a starting position (R), the restoring spring system (24) engages the support structure (2) with the first acting side (24a), said support structure (2) being provided with at least one friction surface (21) essentially concentric to the bearing pin (6) and at least one friction element (10, 11, 12) that rests against the friction surface (21), said friction element (10, 11, 12) having a bottom linkage point (11a, 12a) and a spring-side linkage point (11c, 12c) with the friction surface (21) being disposed between the bottom linkage point (11a, 12a) and the spring-side linkage point (11c, 12c), the bottom linkage point (11a, 12a) being coupled to the pedal lever (3) and the second acting side (24b) of the restoring spring system (24) acting on the spring-side side linkage point (11c, 12c) of the friction element (10, 11, 12) (FIG. 9).

17. The accelerator pedal module according to claim 16, further comprising a second friction surface (22) on said support structure (2) essentially concentric to the bearing pin (6) and a second friction element (12) on said accelerator pedal module (1) resting against the second friction surface (22), said second friction element (12) having a bottom linkage point (12a) and spring-side linkage point (12c), said second friction surface (22) being disposed between the bottom linkage point (12a) and the spring-side linkage point (12c) of the second friction element (22), said second acting side (24b) of the restoring spring system (24) acting on the spring-side linkage point (12c) of the second friction element (12).

18. The accelerator pedal module according to claim 17, wherein the spring-side linkage point (11c) of the first friction element (11) and the spring-side linkage point (12c) of the second friction element (12) are connected to each other via a crossbar (14).

* * * * *